(12) United States Patent
Jiang

(10) Patent No.: US 12,228,828 B2
(45) Date of Patent: Feb. 18, 2025

(54) DISPLAY PANEL AND DISPLAY DEVICE

(71) Applicant: Wuhan China Star Optoelectronics Technology Co., Ltd., Hubei (CN)

(72) Inventor: He Jiang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/438,473

(22) PCT Filed: Aug. 10, 2021

(86) PCT No.: PCT/CN2021/111669
§ 371 (c)(1),
(2) Date: Sep. 13, 2021

(87) PCT Pub. No.: WO2023/000406
PCT Pub. Date: Jan. 26, 2023

(65) Prior Publication Data
US 2024/0272491 A1    Aug. 15, 2024

(30) Foreign Application Priority Data

Jul. 20, 2021  (CN) .......................... 202110816446.1

(51) Int. Cl.
*G02F 1/1343* (2006.01)
*G02F 1/1333* (2006.01)

(52) U.S. Cl.
CPC .... *G02F 1/134336* (2013.01); *G02F 1/13338* (2013.01); *G02F 1/134318* (2021.01)

(58) Field of Classification Search
CPC ........... G02F 1/134336; G02F 1/13338; G02F 1/134318
See application file for complete search history.

(56) References Cited

U.S. PATENT DOCUMENTS

2003/0117558 A1   6/2003   Kim
2022/0163854 A1*  5/2022   Mochizuki ........... G03B 11/045

FOREIGN PATENT DOCUMENTS

| CN | 203025452 | 6/2013 |
|----|-----------|--------|
| CN | 106019730 | 10/2016 |
| CN | 106353939 | 1/2017 |
| CN | 106526990 | 3/2017 |
| CN | 108051963 | 5/2018 |
| CN | 110071160 | 7/2019 |
| CN | 111221189 | 6/2020 |
| CN | 112233560 | 1/2021 |
| KR | 10-2008-0096943 | 11/2008 |

* cited by examiner

Primary Examiner — James A Dudek

(57) ABSTRACT

A display panel and a display device are provided. The display panel has: a plurality of first pixel electrodes arranged in a first display area; and a plurality of second pixel electrodes arranged in a second display area. The plurality of second branch electrodes have at least two different extension directions. The extension directions of the plurality of first branch electrodes of the first pixel electrode are the same.

16 Claims, 7 Drawing Sheets

DISPLAY PANEL AND DISPLAY DEVICE

RELATED APPLICATIONS

This application is a National Phase of PCT Patent Application No. PCT/CN2021/111669 having International filing date of Aug. 10, 2021, which claims the benefit of priority of Chinese Patent Application No. 202110816446.1 filed on Jul. 20, 2021. The contents of the above applications are all incorporated by reference as if fully set forth herein in their entirety.

FIELD AND BACKGROUND OF THE INVENTION

The present disclosure relates to displays, and more particularly to a display panel and a display device.

A liquid crystal display (LCD) is currently the most widely used display product on the market. As users' requirements for products increase, full-screen products with a high screen-to-body ratio have become a highly anticipated development trend for smartphones. Therefore, a technology of under-screen camera is a main development direction of LCD.

For the under-screen camera display technology, a set of polarizers with absorption axes perpendicular to each other are arranged on both sides of the LCD. When the display device is shooting, the liquid crystal molecules above a camera module need to be deflected to a preset angle so that external light can pass through the LCD to enter the camera module. In the current LCD, a single pixel electrode on a side of the array substrate or between two adjacent pixel electrodes is usually designed as a double-domain or multi-domain structure. When external light enters the LCD, the liquid crystal molecules in the imaging area under the screen are affected by the pixel electrodes in different domains. Therefore, the external light passing through the pixel electrodes of different domains in an imaging area under the screen will form incident light with phase difference, which causes a technical problem of ghosting when the camera module takes pictures.

Therefore, there is an urgent need for a display panel and a display device to solve the above-mentioned problems.

SUMMARY OF THE INVENTION

The present application provides a display panel and a display device to improve the technical problem of ghosting during imaging of a camera module in an existing display device.

The present application provides a display panel, comprising: at least one first display area and a second display area located at a periphery of the first display area, wherein:
the display panel comprises: a plurality of first pixel electrodes arranged in the first display area and a plurality of second pixel electrodes arranged in the second display area, wherein the first pixel electrode comprises a plurality of first branch electrodes, the second pixel electrode comprises a plurality of second branch electrodes, and the plurality of second branch electrodes have at least two different extension directions,
wherein an extension direction of each of the first branch electrodes is the same.

In a display panel of the present application, each of the second branch electrodes comprises a first connection section and a second connection section electrically connected to each other, wherein the first connection section extends along a first direction, and the second connection section extends along a second direction,
wherein each of the first branch electrodes extends along the first direction or the second direction, and the first direction and the second direction are different.

In a display panel of the present application, the display panel comprises a plurality of scan lines and a plurality of data lines,
wherein in an extension direction of the scan line or the data line, the second branch electrodes in two adjacent second pixel electrodes respectively extend along the first direction and the second direction, and the second branch electrodes in the two adjacent second pixel electrodes are arranged symmetrically with a center line of the two adjacent second pixel electrodes as an axis; and
wherein each of the first branch electrodes extends along the first direction or the second direction.

In a display panel of the present application, an area of the first pixel electrode is smaller than or equal to an area of the second pixel electrode.

In a display panel of the present application, in a direction from the second display area to the first display area, the area of the first pixel electrode gradually decreases.

In a display panel of the present application, an area of sub-pixels in the first display area close to the second display area is equal to an area of sub-pixels in the second display area, and a ratio of the area of the sub-pixels in the first display area far from the second display area to the area of the sub-pixels in the second display area may range from 0.5 to 1.

In a display panel of the present application, the display panel further comprises a transition pixel electrode, and the transition pixel electrode comprises a first portion arranged in the first display area and a second portion arranged in the second display area,
wherein the first portion comprises a plurality of first transition electrodes, and the second portion comprises a plurality of second transition electrodes, wherein an extension direction of the first transition electrodes is the same as the extension direction of the first branch electrodes, and an extension direction of the second transition electrodes is the same as an extension direction of the second branch electrodes.

In a display panel of the present application, a distance between adjacent branch electrodes in the first portion of the transition pixel electrode is a first distance, and a distance between adjacent branch electrodes in a second portion of the transition pixel electrode is a second distance, wherein the first distance is smaller than the second distance.

In a display panel of the present application, a distance between two adjacent second branch electrodes arranged close to the transition pixel electrode is smaller than the second distance.

In a display panel of the present application, in a direction from the second display area to the first display area, a distance between adjacent branch electrodes in the transition pixel electrode gradually decreases.

The present application further provides a display device. The display device comprises: a display panel; a backlight module arranged opposite to the display panel; and a camera module arranged on a side of the backlight module away from the display panel, the camera module corresponding to a first display area, wherein the display panel comprises at least one first display area and a second display area located at a periphery of the first display area, wherein:

the display panel comprises: a plurality of first pixel electrodes arranged in the first display area and a plurality of second pixel electrodes arranged in the second display area, wherein the first pixel electrode comprises a plurality of first branch electrodes, the second pixel electrode comprises a plurality of second branch electrodes, and the plurality of second branch electrodes have at least two different extension directions, wherein an extension direction of each of the first branch electrodes is the same.

In a display device of the present application, each of the second branch electrodes comprises a first connection section and a second connection section electrically connected to each other, wherein the first connection section extends along a first direction, and the second connection section extends along a second direction, wherein each of the first branch electrodes extends along the first direction or the second direction, and the first direction and the second direction are different.

In a display device of the present application, the display panel comprises a plurality of scan lines and a plurality of data lines, wherein in an extension direction of the scan line or the data line, the second branch electrodes in two adjacent second pixel electrodes respectively extend along the first direction and the second direction, and the second branch electrodes in the two adjacent second pixel electrodes are arranged symmetrically with a center line of the two adjacent second pixel electrodes as an axis; and wherein each of the first branch electrodes extends along the first direction or the second direction.

In a display device of the present application, an area of the first pixel electrode is smaller than or equal to an area of the second pixel electrode.

In a display device of the present application, in a direction from the second display area to the first display area, the area of the first pixel electrode gradually decreases.

In a display device of the present application, an area of sub-pixels in the first display area close to the second display area is equal to an area of sub-pixels in the second display area, and a ratio of the area of the sub-pixels in the first display area far from the second display area to the area of the sub-pixels in the second display area may range from 0.5 to 1.

In a display device of the present application, the display panel further comprises a transition pixel electrode, and the transition pixel electrode comprises a first portion arranged in the first display area and a second portion arranged in the second display area, wherein the first portion comprises a plurality of first transition electrodes, and the second portion comprises a plurality of second transition electrodes, wherein an extension direction of the first transition electrodes is the same as the extension direction of the first branch electrodes, and an extension direction of the second transition electrodes is the same as an extension direction of the second branch electrodes.

In a display device of the present application, a distance between adjacent branch electrodes in the first portion of the transition pixel electrode is a first distance, and a distance between adjacent branch electrodes in a second portion of the transition pixel electrode is a second distance, wherein the first distance is smaller than the second distance.

In a display device of the present application, a distance between two adjacent second branch electrodes arranged close to the transition pixel electrode is smaller than the second distance.

In a display device of the present application, in a direction from the second display area to the first display area, a distance between adjacent branch electrodes in the transition pixel electrode gradually decreases.

The present application provides a display panel and a display device. The display panel comprises: at least one first display area and a second display area located at a periphery of the first display area. The display panel comprises: a plurality of first pixel electrodes arranged in the first display area and a plurality of second pixel electrodes arranged in the second display area, wherein the first pixel electrode comprises a plurality of first branch electrodes, the second pixel electrode comprises a plurality of second branch electrodes, and the plurality of second branch electrodes have at least two different extension directions, wherein an extension direction of each of the first branch electrodes is the same. In the present application, an extension direction of the pixel electrode in the first display area corresponding to a camera module is different from an extension direction of part of the pixel electrodes in the second display area, and the pixel electrode in the first display area is disposed to extend unidirectionally, such that phase changes of an external light passing through the first display area are equal. An incident light received by the camera module has the same phase, which ensures an imaging quality of the camera module.

DESCRIPTION OF SPECIFIC EMBODIMENTS OF THE INVENTION

Figure 1:
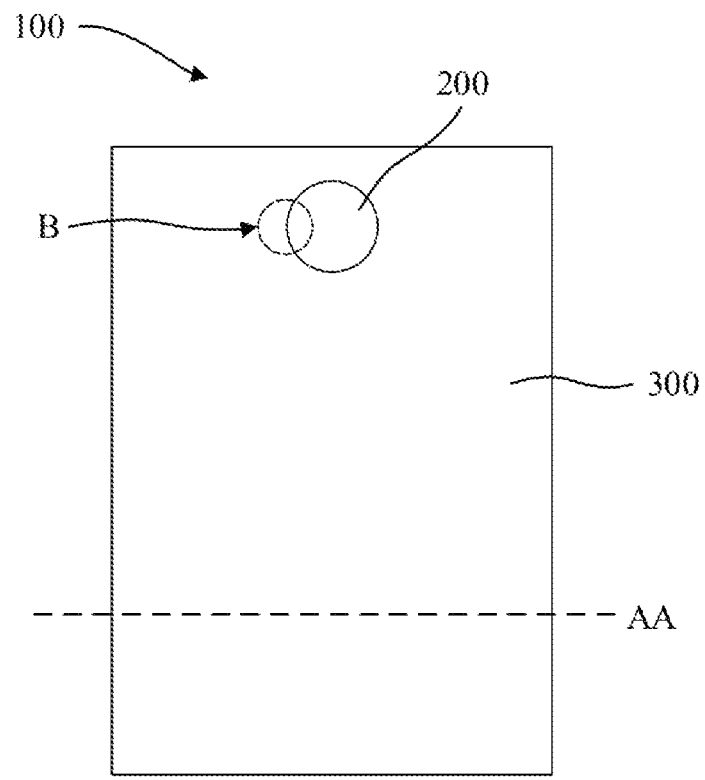
FIG. 1 is a schematic diagram of a first top view structure of a display panel of the application.

The technical solutions in embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In the current LCD, a single pixel electrode on a side of the array substrate or between two adjacent pixel electrodes is usually designed as a double-domain or multi-domain structure. When external light enters the LCD, the liquid crystal molecules in the imaging area under the screen are affected by the pixel electrodes in different domains. Therefore, the external light passing through the pixel electrodes of different domains in an imaging area under the screen will form incident light with phase difference, which causes a technical problem of ghosting when the camera module takes pictures. This application provides following technical solutions to solve the above technical problems.

Referring to FIGS. 1 to 11, the present application provides a display panel 100 that includes at least one first display area 200 and a second display area 300 located at a periphery of the first display area 200.

In this embodiment, the display panel 100 includes: a plurality of first pixel electrodes 20 arranged in the first display area 200 and a plurality of second pixel electrodes 30 arranged in the second display area 300. The first pixel electrode 20 includes a plurality of first branch electrodes 21, the second pixel electrode 30 includes a plurality of second branch electrodes 31, and the plurality of second branch electrodes 31 have at least two different extension directions.

In this embodiment, an extension direction of each of the first branch electrodes 21 is the same.

Figure 5:
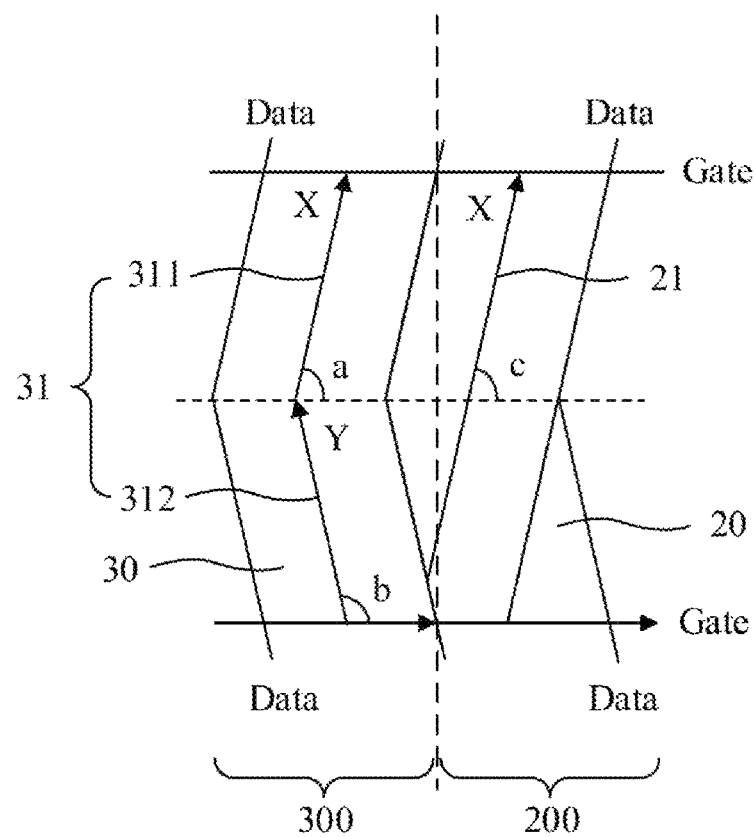
FIG. 5 is a simplified diagram of a connection between a branch electrode and a scan line in FIG. 4.

In this embodiment, a definition of the extension direction can be specifically referred to FIG. 5, and a data transmission direction of the data line can be taken as the standard.

In this embodiment, an extension direction of the first branch electrode 21 and the second branch electrode 31 refers to a single extension direction. For example, in FIG. 5, the first branch electrode 21 has one extension direction, and the second branch electrode 31 has two extension directions.

In this embodiment, the first display area 200 may be an under-screen camera area of the display panel 100, and the second display area 300 may be a conventional display area of the display panel 100. When the display device displays, the first display area 200 and the second display area 300 perform normal display. When the display device uses a camera module 600, the first display area 200 is a channel for external light to enter the camera module 600, and the second display area 300 performs normal display.

In the present application, an extension direction of the pixel electrode in the first display area 200 corresponding to the camera module 600 is different from the extension direction of part of the pixel electrode in the second display area 300, and the pixel electrode in the first display area 200 is arranged to extend unidirectionally, such that phase changes of the external light passing through the first display area 200 are equal. Therefore, an incident light received by the camera module 600 has the same phase, and an imaging quality of the camera module 600 is guaranteed.

The technical solution of the present application will now be described in conjunction with specific embodiments.

Figure 2:
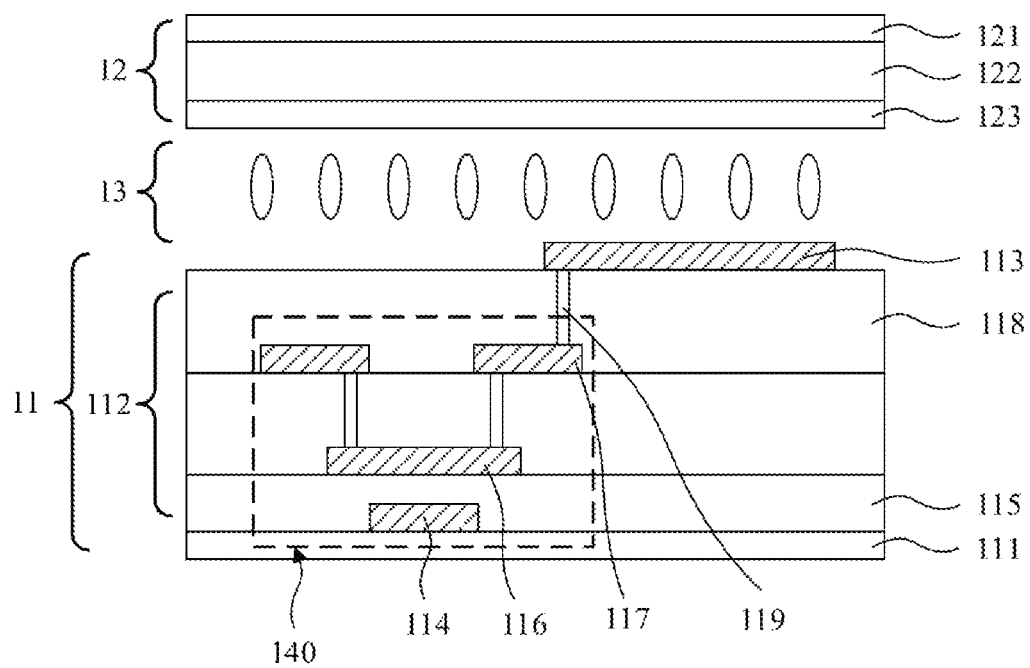
FIG. 2 is a cross-sectional view of section AA in FIG. 1.

Refer to FIG. 2, which is a cross-sectional view of section AA in FIG. 1.

The display panel 100 may include an array substrate 11, a color filter substrate 12 disposed opposite to the array substrate 11, and a liquid crystal layer 13 disposed between the array substrate 11 and the color filter substrate 12. The array substrate 11 may be a conventional array substrate 11 or a COA (Color filter on Array) substrate, which is not specifically limited in this application. In following embodiments, the present application takes a conventional array substrate 11 as an example for description.

The array substrate 11 may include a first substrate 111, a thin film transistor layer 112 on the first substrate 111, and a pixel electrode layer 113 provided on the thin film transistor layer 112.

In this embodiment, material of the first substrate 111 may be made of materials such as glass, quartz, or polyimide. The thin film transistor layer 112 may include a plurality of thin film transistors 140. The thin film transistor 140 may be an etch-stop type, a back-channel etch type, or a top-gate thin film transistor type structure, which is not specifically limited in this application. For example, the thin film transistor 140 of the bottom gate thin film transistor type may include: a gate layer 114 on the first substrate 111, a gate insulating layer 115 on the gate layer 114, a semiconductor layer 116 on the gate insulating layer 115, a source and drain layer 117 on the semiconductor layer 116, and a passivation layer 118 is located on the source and drain layer 117. The gate layer may include a gate and a scan line Gate. The source-drain layer may include a source electrode, a drain electrode, a data line Data, etc. A contact hole 119 is formed on the passivation layer 118. The pixel electrode layer 113 is connected to the source/drain of the thin film transistor 140 through the contact hole 119.

In this embodiment, the color filter substrate 12 includes a second substrate 121, a color filter layer 122 on the second substrate 121, and a common electrode layer 123 on the color filter layer 122. The common electrode layer 123 is disposed opposite to the pixel electrode layer 113.

Figure 3:
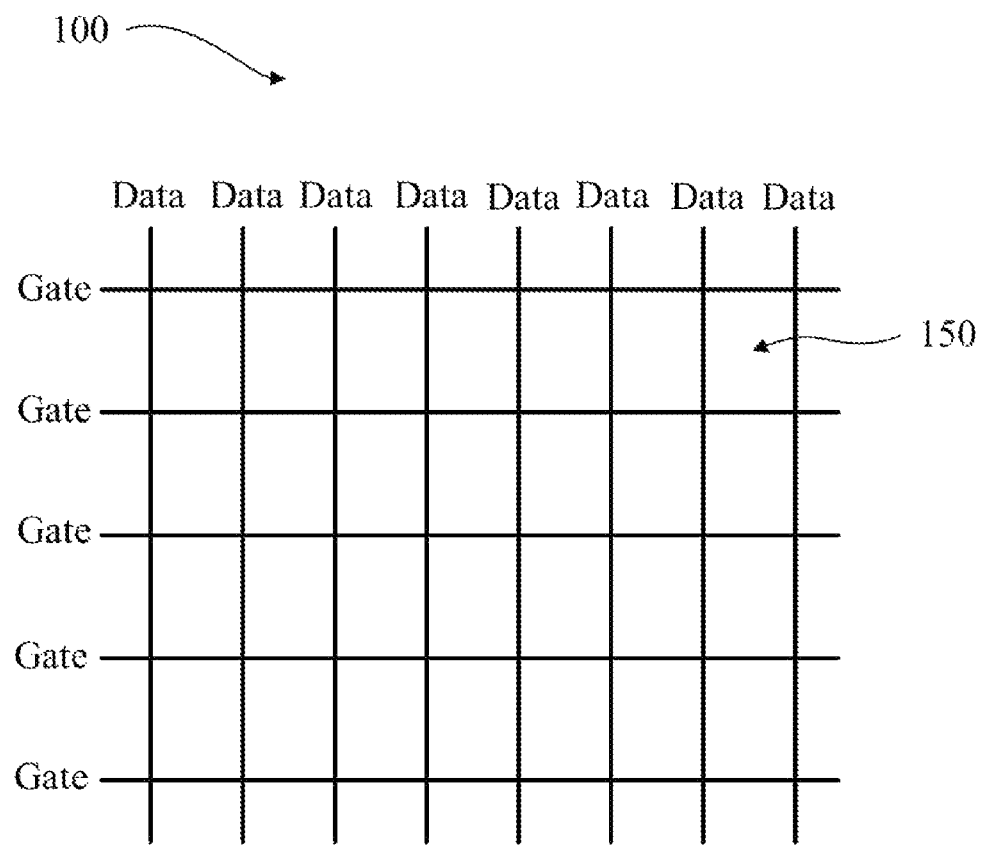
FIG. 3 is a schematic diagram of a second top view structure of a display panel of the application.

In this embodiment, referring to FIG. 3, a plurality of the scan lines Gate and a plurality of the data lines Data divide the display panel 100 into a plurality of sub-pixels 150. Each sub-pixel 150 is provided with the first pixel electrode 20 or the second pixel electrode 30. That is, the pixel electrode layer 113 is divided into a plurality of first pixel electrodes 20 and a plurality of second pixel electrodes 30 by a plurality of the scan lines Gate and a plurality of the data lines Data. The voltage difference between the first pixel electrode 20 or the second pixel electrode 30 and the common electrode layer drives the deflection of liquid crystal molecules in the liquid crystal layer 13.

In order to solve the problem of the viewing angle of the LCD display panel 100, a single pixel electrode or two adjacent pixel electrodes in the current LCD are usually designed as a double-domain or multi-domain structure. However, the external light is affected by the liquid crystal molecules in different domains to form incident light with phase difference, resulting in abnormal imaging of the camera module 600. In the present application, the pixel electrode in the under-screen imaging area is configured as a single domain structure to prevent the external light passing through the first display area 200 from having a phase difference.

In this embodiment, the extension direction of the second branch electrode 31 may be at least two kinds. In the following embodiments, two extension directions of the second branch electrode 31 are used as an example for illustration.

Figure 4:
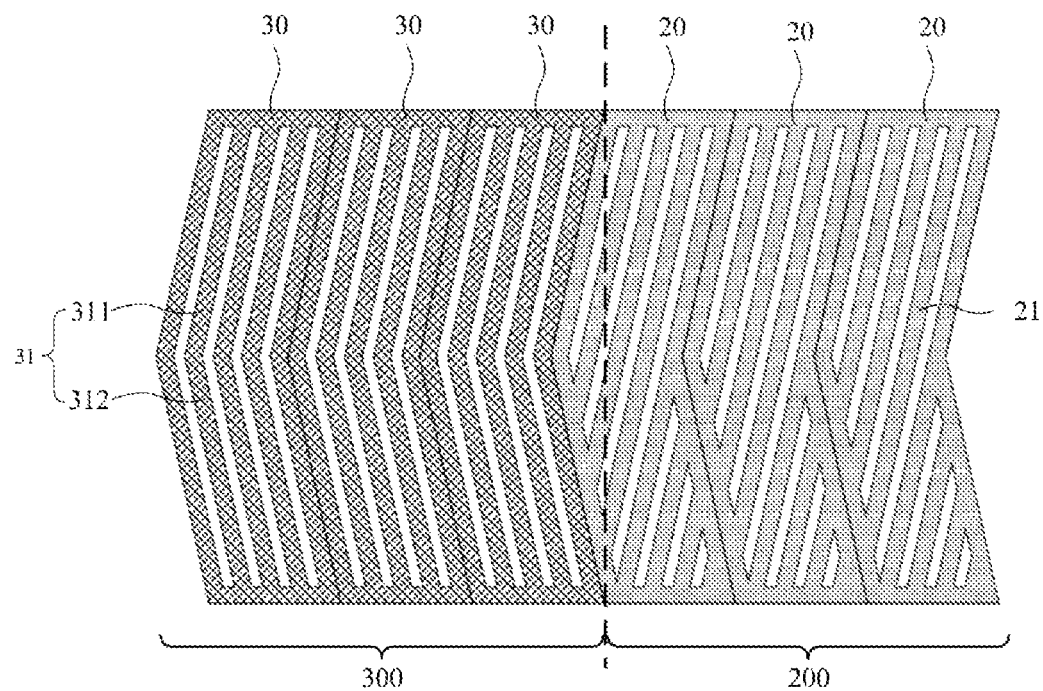
FIG. 4 is a first enlarged view of area B in FIG. 1.

Refer to FIG. 4, which is a first enlarged view of area B in FIG. 1.

In each of the second pixel electrodes 30, each of the second branch electrodes 31 includes a first connection section 311 and a second connection section 312 that are electrically connected to each other. The first connection section 311 extends along a first direction X, and the second connection section 312 extends along a second direction Y.

Each of the first branch electrodes 21 extends along the first direction X or the second direction Y, and the first direction X and the second direction Y are different.

In this embodiment, the first direction X and the second direction Y are not specifically limited here, and the first direction X and the second direction Y may be arranged non-parallel.

In a structure in FIG. 4, the second pixel electrode 30 is illustrated by taking a double domain structure as an example.

In one of the second pixel electrodes 30, a plurality of the first connection segments 311 extend in a corresponding sub-pixel 150 along the first direction X, and a plurality of second connecting segments 312 extend in a corresponding sub-pixel 150 along the second direction Y. The included angle between the first direction X and the second direction Y is not specifically limited in this application. For example, referring to the structure in FIG. 5, an angle between the first connection section 311 and the extending direction of the scan line Gate may be labeled as "a", and an angle between the second connection section 312 and an extending direction of the scan line Gate may be labeled as "b". Since the first connection section 311 and the second connection section 312 may be symmetrically arranged with their center lines, a sum of the values a and b may be 180°.

In one of the first pixel electrodes 20, a plurality of the first branch electrodes 21 may extend in a corresponding sub-pixel 150 along the first direction X or the second direction Y. An angle between the first branch electrode 21 and the extension direction of the scan line Gate may be labeled as "c". The value c can be equal to the value a.

In this embodiment, an area of the first pixel electrode 20 may be equal to an area of the second pixel electrode 30.

In this embodiment, the second pixel electrode 30 located in the second display area 300 has a double domain structure, and different segments of the second pixel electrode 30 extend in different directions. An internal light passes through the pixel electrode of the double domain structure, thereby eliminating a technical problem of poor viewing angle of the LCD display panel 100. Secondly, the first pixel electrode 20 located in the first display area 200 has a single domain structure, and each of the first branch electrodes 21 may extend along the first direction X. The phase changes of the external light passing through the first display area 200 are equal, and the incident light received by the camera module 600 has the same phase, which ensures the imaging quality of the camera module 600.

Figure 6:
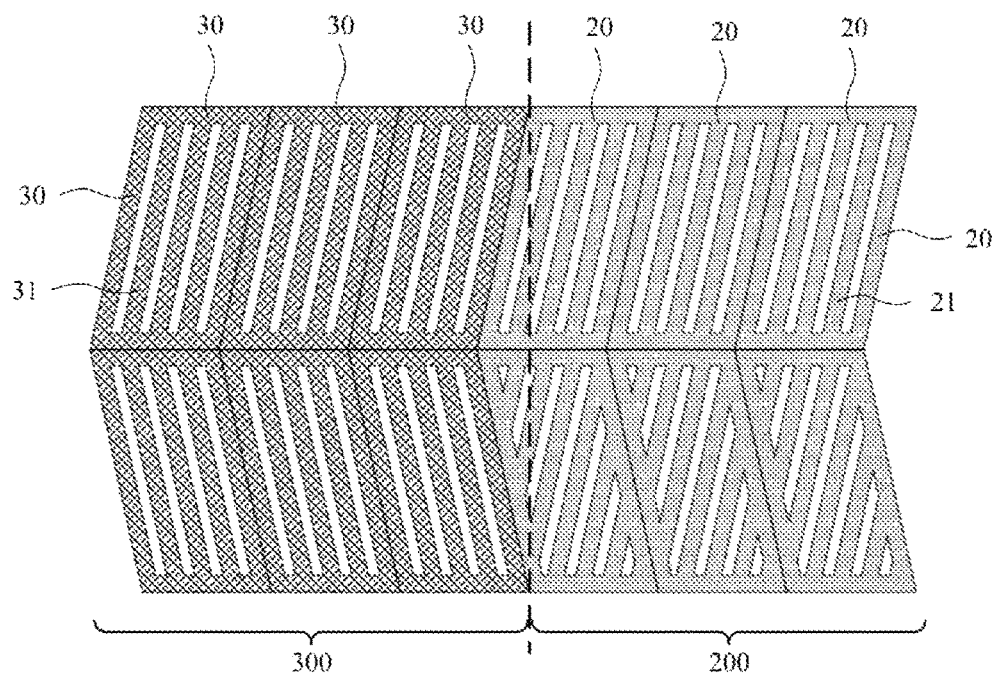
FIG. 6 is a second enlarged view of area B in FIG. 1.

Refer to FIG. 6, which is a second enlarged view of area B in FIG. 1.

In an extension direction of the scan line Gate or the data line Data, the second branch electrodes 31 in two adjacent second pixel electrodes 30 respectively extend along the first direction X and the second direction Y. The second branch electrodes 31 in the two adjacent second pixel electrodes 30 are arranged symmetrically with a center line of two adjacent second pixel electrodes 30 as an axis. Each of the first branch electrodes 21 extends along the first direction X or the second direction Y.

In this embodiment, the first direction X and the second direction Y are not specifically limited here. The first direction X and the second direction Y can be arranged non-parallel. For details, refer to the schematic diagram in FIG. 5.

In a structure in FIG. 6, the second pixel electrode 30 is described by taking a single domain structure as an example.

In the second display area 300, a plurality of second branch electrodes 31 in one second pixel electrode 30 extend along the first direction X or the second direction Y, and the second branch electrodes 31 in the two adjacent second pixel electrodes 30 may be symmetrically arranged with the scan line Gate between the two adjacent second pixel electrodes 30 as a center line. That is, each of the second pixel electrodes 30 has a single-domain structure, but two adjacent second pixel electrodes 30 are combined into a double-domain structure, which eliminates the technical problem of poor viewing angle of the LCD display panel 100.

In this embodiment, an area of the first pixel electrode 20 may be equal to an area of the second pixel electrode 30.

In the first display area 200, the first branch electrode 21 in each of the first pixel electrodes 20 may extend in a corresponding sub-pixel 150 along the first direction X. That is, each of the first pixel electrodes 20 has a single-domain structure with a single extending direction. The phase changes of the external light passing through the two adjacent first pixel electrodes 20 are equal, and the incident light received by the camera module 600 has the same phase, which ensures the imaging quality of the camera module 600.

As shown in a structure shown in FIG. 6, in an extension direction of the data line Data, extension directions of the first branch electrodes 21 of the two adjacent first pixel electrodes 20 are the same, but the pixel structures are different. For example, the pixel structures of the first pixel electrodes 20 in odd rows are the same, the pixel structures of the first pixel electrodes 20 in even rows are the same, and the pixel structures of the first pixel electrodes 20 in odd rows and even rows are different; and the pixel structure of each of the first pixel electrodes 20 in the odd or even rows is the same as the pixel structure of each of the second pixel electrodes 30. Secondly, in the structure of FIG. 4, in the extension direction along the data line Data, the extension direction and the pixel structure of the first branch electrode 21 in each of the first pixel electrodes 20 are the same. And the pixel structure of each first pixel electrode 20 and the pixel structure of each second pixel electrode 30 are different.

The structure of FIG. 6 is compared with the structure of FIG. 4. The structure of FIG. 4 is suitable for an arrangement structure of low pixel density, and the structure of FIG. 6 is suitable for the arrangement structure of high pixel density. That is, the area of one pixel electrode in FIG. 4 may be equivalent to the area of two pixel electrodes in FIG. 6, and different pixel electrode structures are required to be selected for different pixel densities.

Figure 7:
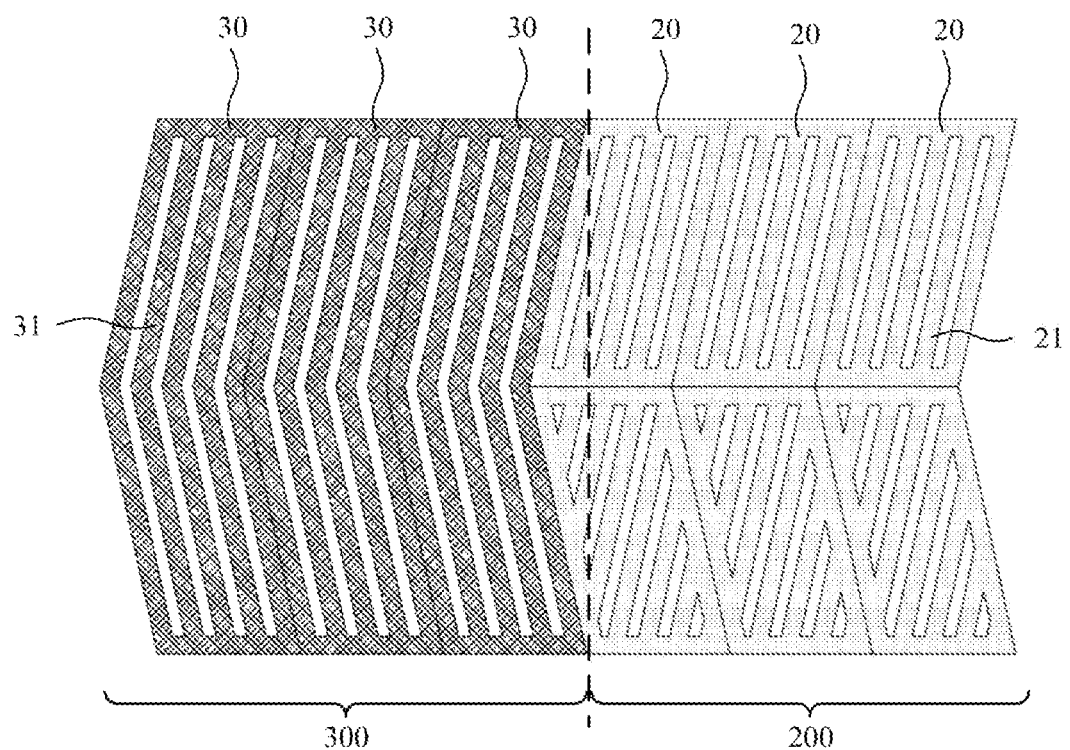
FIG. 7 is a third enlarged view of area B in FIG. 1.

Refer to FIG. 7, which is a third enlarged view of area B in FIG. 1.

In this embodiment, an area of the first pixel electrode 20 may be smaller than or equal to an area of the second pixel electrode 30. Since the first display area 200 is an under-screen camera area, external light enters the camera module 600 through the first pixel electrode 20 in the first display area 200. Therefore, the smaller the area of the first pixel electrode 20 is, the higher the pixel density of the first display area 200 is, and the display effect of the under-screen imaging area is better.

In this embodiment, the structures in FIG. 6 and FIG. 4 are combined, and the structures of the first pixel electrode 20 in FIG. 6 and the second pixel electrode 30 in FIG. 4 are used. Under a condition of ensuring the resolution of the conventional display area, the area of the first pixel electrode 20 in the first display area 200 is reduced, such that a density of the first pixel electrode 20 per unit area is increased. Therefore, although the external light passing through the first display area 200 will decrease and the imaging quality of the camera module 600 will be reduced, the increase in pixel density improves the display effect of the camera area under the screen.

Figure 8:
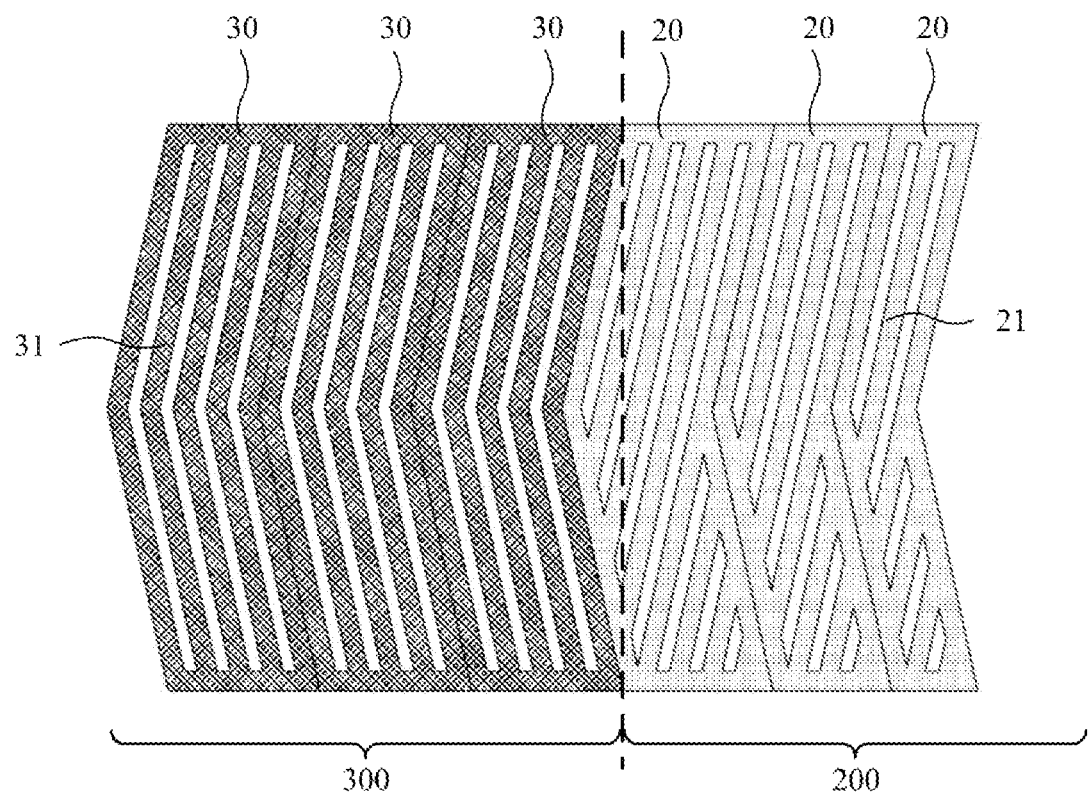
FIG. 8 is a fourth enlarged view of area B in FIG. 1.

Refer to FIG. 8, which is a fourth enlarged view of the area B in FIG. 1.

In this embodiment, in a direction from the second display area 300 to the first display area 200, the area of the first pixel electrode 20 gradually decreases. Since pixel densities of the first display area 200 and the second display area 300 are different, a relatively abrupt image quality change may occur at the junction of the first display area 200 and the second display area 300. Therefore, as shown in FIG. 8, in a direction from the second display area 300 to the first display area 200, the area of the sub-pixel 150 in the first display area 200 gradually decreases. The area of the sub-pixel 150 close to the second display area 300 in the first display area 200 is the largest.

Since a change in the area of the sub-pixel 150 is equivalent to a change in the area of the corresponding pixel electrode, this embodiment will gradually reduce the area of the first pixel electrode 20 in the direction from the second display area 300 to the first display area 200, so that the picture quality changes from the second display area 300 to the first display area 200 gradually transition. The technical problem of sudden changes in picture quality at the junction of the first display area 200 and the second display area 300 is eliminated.

In this embodiment, an area of the sub-pixel 150 in the first display area 200 close to the second display area 300 is equal to the area of the sub-pixel 150 in the second display area 300, and a ratio of the area of the sub-pixel 150 far from the second display area 300 in the first display area 200 to the area of the sub-pixel 150 in the second display area 300 may range from 0.5 to 1.

When the area of the sub-pixel 150 in the first display area 200 is too small (For example, when the area of the sub-pixel 150 in the first display area 200 far from the second display area 300 is less than half of the area of the sub-pixel 150 in the second display area 300), even if there is a transition between the second display area 300 and the first display area 200, due to the large difference in pixel density between the two, when the display panel 100 is normally displayed, the picture quality at the junction of the first display area 200 and the second display area 300 will still have a certain sudden change.

Figure 9:
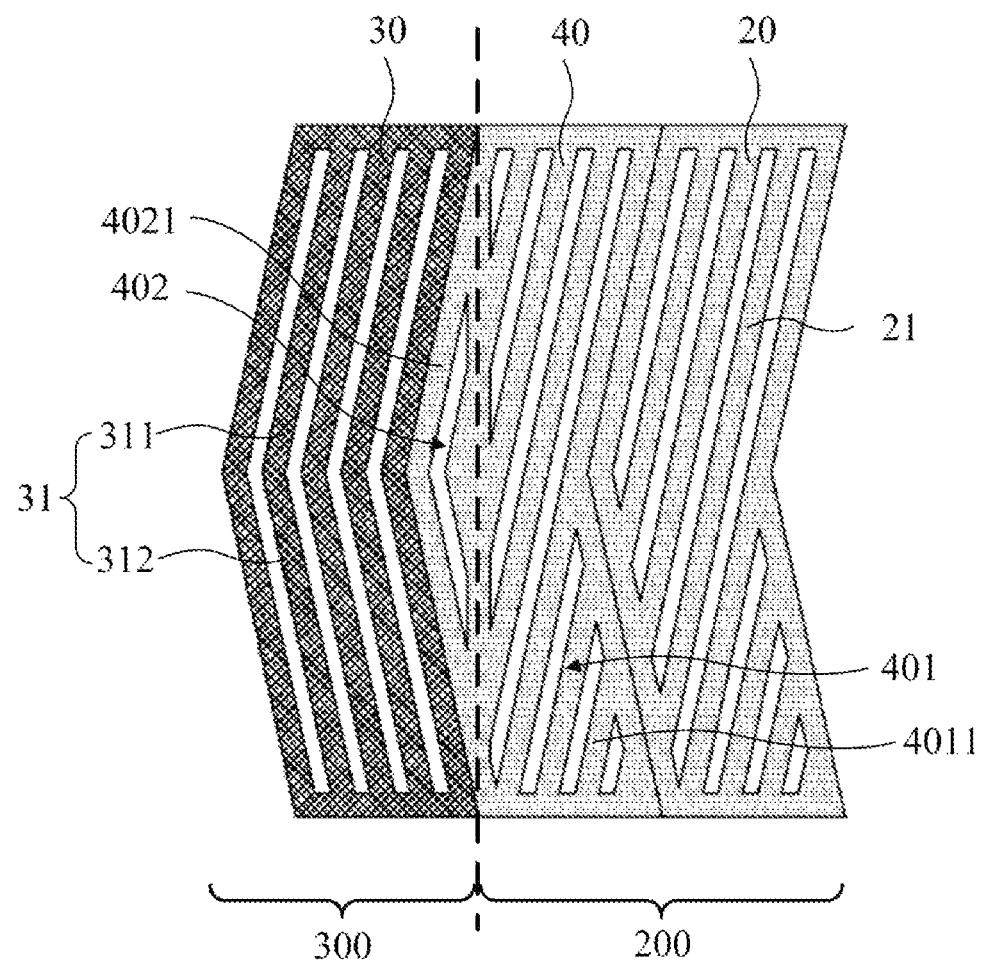
FIG. 9 is a fifth enlarged view of area B in FIG. 1.

Refer to FIG. 9, which is a fifth enlarged view of area B in FIG. 1.

On a basis of the foregoing embodiment, the display panel 100 may further include a transition pixel electrode 40. The transition pixel electrode 40 may include a first portion 401 disposed in the first display area 200 and a second portion 402 disposed in the second display area 300. The first portion 401 includes a plurality of first transition electrodes 4011, and the second portion 402 includes a plurality of second transition electrodes 4021. An extension direction of the first transition electrode 4011 is the same as an extension direction of the first branch electrode 21, and an extension direction of the second transition electrode 4021 is the same as an extension direction of the second branch electrode 31.

In this embodiment, part of the pixel electrodes will exist in the first display area 200 and the second display area 300 at the same time. For the pixel electrode in the first display area 200, it needs to have a single extension direction, and for the pixel electrode in the second display area 300, it needs to have at least two extension directions to improve the technical problem of LCD viewing angle. Therefore, in the structure of FIG. 9, the extension direction of the first transition electrode 4011 in the transition pixel electrode 40 may be the same as the extension direction of the first branch electrode 21. The pixel electrodes with different extension directions are avoided such that the external light passing through the first display area 200 has a different phase difference. In addition, the extension direction of the second transition electrode 4021 in the transition pixel electrode 40 may be the same as the extension direction of the second branch electrode 31. The pixel electrodes with different extension directions can improve the technical problem of the viewing angle of the LCD, so as to ensure that the viewing angle of any area in the second display area 300 is improved.

Figure 10:
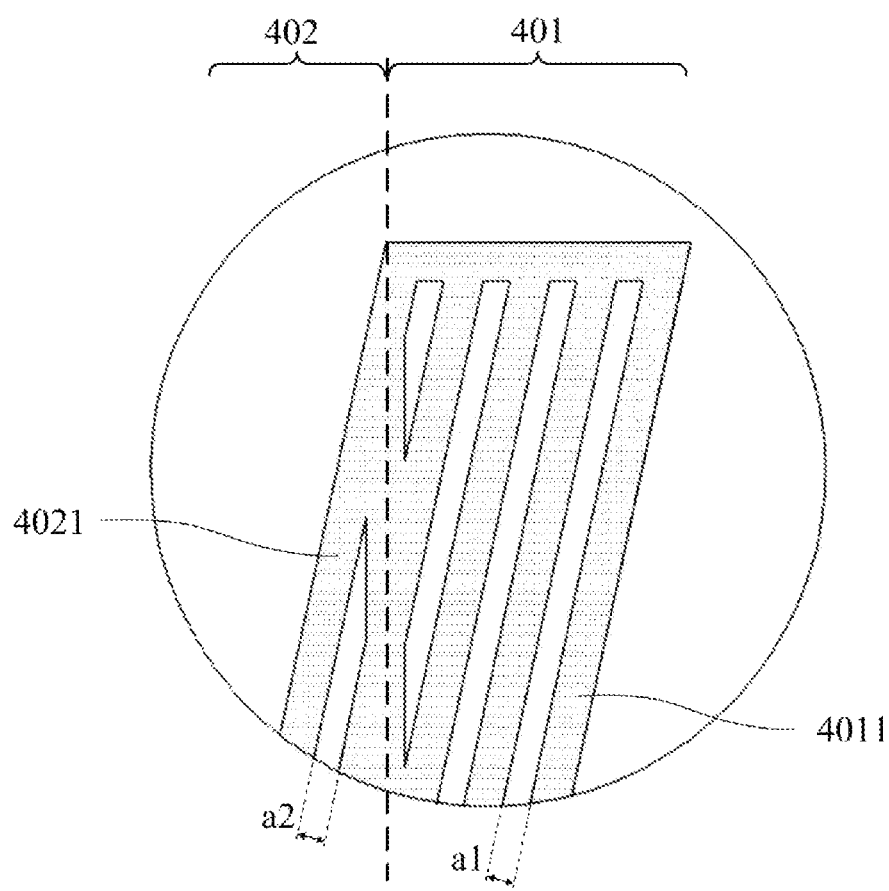
FIG. 10 is a partial enlarged view of a transition pixel in FIG. 9.

In this embodiment, referring to FIG. 9 and FIG. 10, a distance between adjacent first transition electrodes 4011 in the transition pixel electrodes 40 is a first distance a1, a distance between adjacent second transition electrodes 4021 in the transition pixel electrode 40 is a second distance a2, and the first distance a1 is smaller than the second distance a2.

In this embodiment, the first portion 401 of the transition pixel electrode 40 is located in the first display area 200, and the first distance a1 is smaller than the second distance a2. Therefore, the distance between adjacent first transition electrodes 4011 in the transition pixel electrode 40 is smaller than the distance between adjacent second transition electrodes 4021 in the transition pixel electrode 40. That is, under the same area, a ratio of the area of the first transition electrode 4011 is greater than a ratio of the area of the second transition electrode 4021.

It can be understood that a slit distance between adjacent first transition electrodes 4011 in the transition pixel electrode 40 is smaller than a slit distance between adjacent second transition electrodes 4021 in the transition pixel electrode 40.

When the transition pixel electrode 40 is energized, the extension direction of the transition electrode in the first portion 401 and the second portion 402 of the transition pixel electrode 40 is different, so the liquid crystal molecules corresponding to the first portion 401 and the second portion 402 of the transition pixel electrode 40 have different deflection directions, and there is a corresponding interaction force between the liquid crystal molecules of different deflection directions. The area of the second transition electrode 4021 in the second portion 402 occupies a relatively small area. Therefore, the liquid crystal molecules corresponding to the second transition electrode 4021 in the second portion 402 exert a weak force on the branch electrode corresponding to the first transition electrode 4011 in the first portion 401. The influence of the liquid crystal molecules corresponding to the first transition electrode 4011 on the adjacent liquid crystal molecules of different deflection directions is reduced.

In this embodiment, a distance between two adjacent second branch electrodes 31 disposed close to the transition pixel electrode 40 is smaller than the second distance a2. In the second display area 300, the second pixel electrode 30 is provided with a second pixel electrode 30 close to the transition pixel electrode 40. In order to ensure a luminous brightness and luminous efficiency of the second display area 300, the two adjacent second branch electrodes 31 in the second pixel electrode 30 need to be smaller than the second distance a2. That is, an area ratio of the second branch electrode 31 is greater than an area ratio of the branch electrode in the second portion 402 of the transition pixel electrode 40.

The structure in FIG. 9 can consider a single extension direction required by the first display area 200 to avoid the phase difference generated by the external light entering the display panel 100, and it can also consider at least two extension directions required by the second display area 300 to improve the technical problem of the viewing angle of the LCD. However, multiple extension directions of the same pixel electrode will bring about complicated process problems and the stability of the product structure.

Figure 11:
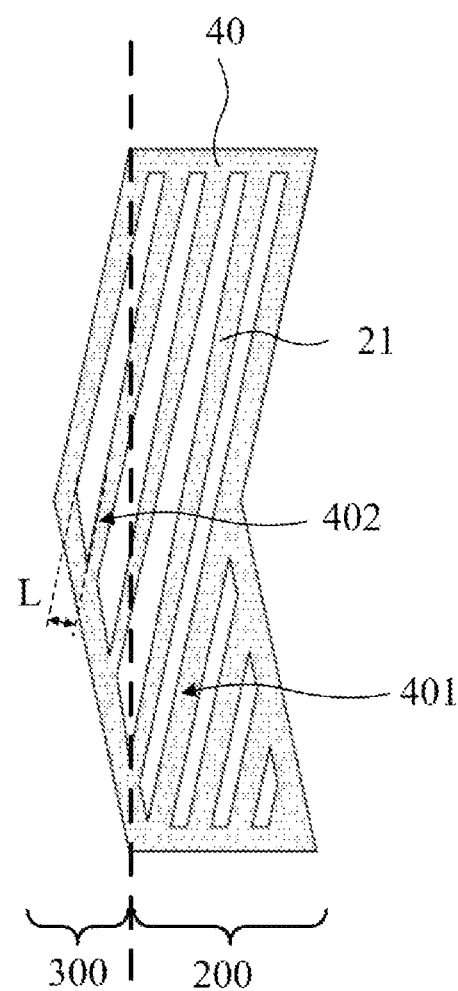
FIG. 11 is a sixth enlarged view of area B in FIG. 1.

Refer to FIG. 11, which is a sixth enlarged view of area B in FIG. 1.

In this embodiment, an extension direction of the first portion 401 of the transition pixel electrode 40 may be the same as the extension direction of the first branch electrode 21. An extension direction of the second portion 402 of the transition pixel electrode 40 may also be the same as the extension direction of the first branch electrode 21.

A structure in FIG. 11 is the same as that of a conventional unidirectionally extending pixel electrode, except that: in the direction from the second display area 300 to the first display area 200, the distance L between adjacent branch electrodes in the transition pixel electrode 40 gradually decreases. That is, under the same area, the area ratio of the branch electrodes of the transition pixel electrode 40 in the second display area 300 is smaller than the area ratio of the branch electrodes of the transition pixel electrode 40 in the first display area 200.

In the present application, the extension direction of the pixel electrode in the first display area 200 corresponding to the camera module 600 is different from the extension direction of part of the pixel electrode in the second display area 300, and the pixel electrodes in the first display area 200 are arranged to extend unidirectionally, such that the phase changes of the external light passing through the first display area 200 are equal. The incident light received by the camera module 600 has the same phase, which ensures the imaging quality of the camera module 600. At the same time, the area ratio of the branch electrodes in the first display area 200 is greater than the area ratio of the branch electrodes in the second display area 300. The influence of the branch electrodes extending in multiple directions in the second display area 300 on the branch electrodes extending in one direction in the first display area 200 is reduced, and the phase changes of the external light passing through the first display area 200 are ensured to be equal.

Figure 12:
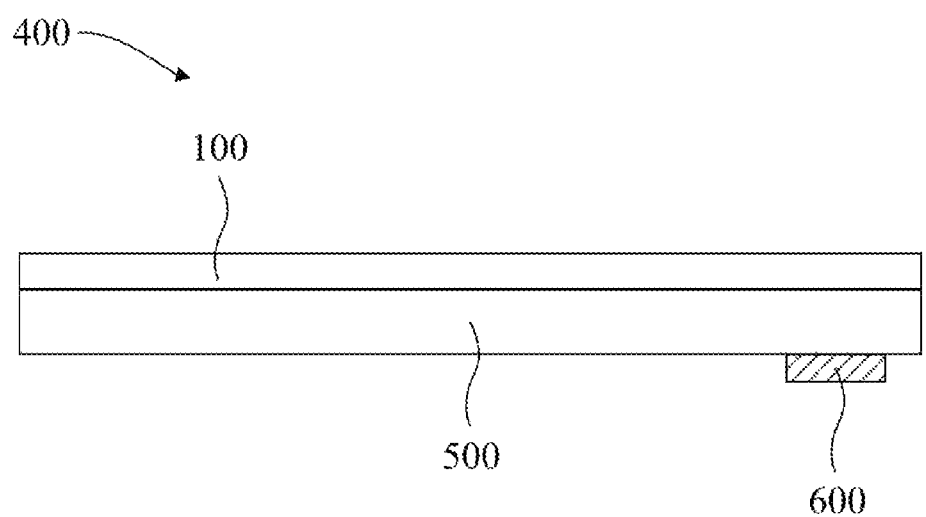
FIG. 12 is a schematic diagram of a structure of a display device of the application.

Referring to FIG. 12, this application also provides a display device 400. The display device includes the above-mentioned display panel 100, a backlight module 500 disposed opposite to the display panel 100, and a camera module 600 disposed on a side of the backlight module 500 away from the display panel 100. The camera module 600 corresponds to the first display area 200.

In this embodiment, the camera module 600 may also include an opening and closing plate (not shown). A surface of the opening and closing plate close to the display panel 100 is made of reflective material.

In this embodiment, when the camera module 600 is working, the opening and closing plate of the camera module 600 is opened, and external light can pass through the first display area to enter the camera module 600. When the camera module 600 is in a non-working state, the opening and closing plate of the camera module 600 is closed. When external light enters the display panel, the opening and closing plate reflects the corresponding light to avoid damage to the camera module 600 caused by the external light.

In this embodiment, the working principle of the display device is the same as or similar to the working principle of the display panel, which will not be repeated here. The display device may be, but is not limited to, a mobile phone, a computer, a notebook, etc.

The present application provides a display panel and a display device. The display panel comprises: at least one first display area and a second display area located at a periphery of the first display area. The display panel comprises: a plurality of first pixel electrodes arranged in the first display area and a plurality of second pixel electrodes arranged in the second display area, wherein the first pixel electrode comprises a plurality of first branch electrodes, the second pixel electrode comprises a plurality of second branch electrodes, and the plurality of second branch electrodes have at least two different extension directions, wherein an extension direction of each of the first branch electrodes is the same. In the present application, an extension direction of the pixel electrode in the first display area corresponding to a camera module is different from an extension direction of part of the pixel electrodes in the second display area, and the pixel electrode in the first display area is disposed to extend unidirectionally, such that phase changes of an external light passing through the first display area are equal. An incident light received by the camera module has the same phase, which ensures an imaging quality of the camera module.

It is understandable that for those of ordinary skill in the art, equivalent substitutions or changes can be made according to the technical solution of the present application and its inventive concept. All these changes or replacements shall fall within the protection scope of the appended claims of this application.

The invention claimed is:

1. A display panel, comprising: at least one first display area and a second display area located at a periphery of the first display area, wherein:
   the display panel comprises: a plurality of first pixel electrodes arranged in the first display area and a plurality of second pixel electrodes arranged in the second display area, wherein the first pixel electrode comprises a plurality of first branch electrodes, the second pixel electrode comprises a plurality of second branch electrodes, and the plurality of second branch electrodes have at least two different extension directions;
   wherein an extension direction of each of the first branch electrodes is the same;
   wherein an area of the first pixel electrode is smaller than or equal to an area of the second pixel electrode;
   wherein in a direction from the second display area to the first display area, the area of the first pixel electrode gradually decreases.

2. The display panel according to claim 1, wherein each of the second branch electrodes comprises a first connection section and a second connection section electrically connected to each other, wherein the first connection section extends along a first direction, and the second connection section extends along a second direction,
   wherein each of the first branch electrodes extends along the first direction or the second direction, and the first direction and the second direction are different.

3. The display panel according to claim 1, wherein the display panel comprises a plurality of scan lines and a plurality of data lines,
   wherein in an extension direction of the scan line or the data line, the second branch electrodes in two adjacent second pixel electrodes respectively extend along the first direction and the second direction, and the second branch electrodes in the two adjacent second pixel electrodes are arranged symmetrically with a center line of the two adjacent second pixel electrodes as an axis; and wherein each of the first branch electrodes extends along the first direction or the second direction.

4. The display panel according to claim 1, wherein an area of sub-pixels in the first display area close to the second display area is equal to an area of sub-pixels in the second display area, and a ratio of the area of the sub-pixels in the first display area far from the second display area to the area of the sub-pixels in the second display area may range from 0.5 to 1.

5. The display panel according to claim 1, wherein the display panel further comprises a transition pixel electrode, and the transition pixel electrode comprises a first portion arranged in the first display area and a second portion arranged in the second display area, wherein the first portion comprises a plurality of first transition electrodes, and the second portion comprises a plurality of second transition electrodes, wherein an extension direction of the first transition electrodes is the same as the extension direction of the first branch electrodes, and an extension direction of the second transition electrodes is the same as an extension direction of the second branch electrodes.

6. The display panel according to claim 5, wherein a distance between adjacent branch electrodes in the first portion of the transition pixel electrode is a first distance, and a distance between adjacent branch electrodes in a second portion of the transition pixel electrode is a second distance, wherein the first distance is smaller than the second distance.

7. The display panel according to claim 6, wherein a distance between two adjacent second branch electrodes arranged close to the transition pixel electrode is smaller than the second distance.

8. The display panel according to claim 5, wherein in a direction from the second display area to the first display area, a distance between adjacent branch electrodes in the transition pixel electrode gradually decreases.

9. A display device, comprising: a display panel; a backlight module arranged opposite to the display panel; and a camera module arranged on a side of the backlight module away from the display panel, the camera module corresponding to a first display area, wherein the display panel comprises at least one first display area and a second display area located at a periphery of the first display area, wherein:

the display panel comprises: a plurality of first pixel electrodes arranged in the first display area and a plurality of second pixel electrodes arranged in the second display area, wherein the first pixel electrode comprises a plurality of first branch electrodes, the second pixel electrode comprises a plurality of second branch electrodes, and the plurality of second branch electrodes have at least two different extension directions, wherein an extension direction of each of the first branch electrodes is the same;

wherein an area of the first pixel electrode is smaller than or equal to an area of the second pixel electrode;

wherein in a direction from the second display area to the first display area, the area of the first pixel electrode gradually decreases.

10. The display device according to claim 9, wherein each of the second branch electrodes comprises a first connection section and a second connection section electrically connected to each other, wherein the first connection section extends along a first direction, and the second connection section extends along a second direction, wherein each of the first branch electrodes extends along the first direction or the second direction, and the first direction and the second direction are different.

11. The display device according to claim 9, wherein the display panel comprises a plurality of scan lines and a plurality of data lines, wherein in an extension direction of the scan line or the data line, the second branch electrodes in two adjacent second pixel electrodes respectively extend along the first direction and the second direction, and the second branch electrodes in the two adjacent second pixel electrodes are arranged symmetrically with a center line of the two adjacent second pixel electrodes as an axis; and wherein each of the first branch electrodes extends along the first direction or the second direction.

12. The display device according to claim 9, wherein an area of sub-pixels in the first display area close to the second display area is equal to an area of sub-pixels in the second display area, and a ratio of the area of the sub-pixels in the first display area far from the second display area to the area of the sub-pixels in the second display area may range from 0.5 to 1.

13. The display device according to claim 9, wherein the display panel further comprises a transition pixel electrode, and the transition pixel electrode comprises a first portion arranged in the first display area and a second portion arranged in the second display area, wherein the first portion comprises a plurality of first transition electrodes, and the second portion comprises a plurality of second transition electrodes, wherein an extension direction of the first transition electrodes is the same as the extension direction of the first branch electrodes, and an extension direction of the second transition electrodes is the same as an extension direction of the second branch electrodes.

14. The display device according to claim 13, wherein a distance between adjacent branch electrodes in the first portion of the transition pixel electrode is a first distance, and a distance between adjacent branch electrodes in a second portion of the transition pixel electrode is a second distance, wherein the first distance is smaller than the second distance.

15. The display device according to claim 14, wherein a distance between two adjacent second branch electrodes arranged close to the transition pixel electrode is smaller than the second distance.

16. The display device according to claim 13, wherein in a direction from the second display area to the first display area, a distance between adjacent branch electrodes in the transition pixel electrode gradually decreases.

* * * * *